United States Patent
Bidault

(10) Patent No.: US 11,501,424 B2
(45) Date of Patent: Nov. 15, 2022

(54) NEURAL NETWORK TRAINING DEVICE, SYSTEM AND METHOD

(71) Applicant: STMICROELECTRONICS (ROUSSET) SAS, Rousset (FR)

(72) Inventor: Laurent Bidault, Trets (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 77 days.

(21) Appl. No.: 16/687,345

(22) Filed: Nov. 18, 2019

(65) Prior Publication Data

US 2021/0150688 A1    May 20, 2021

(51) Int. Cl.
G06T 7/00     (2017.01)
G06N 3/04     (2006.01)

(52) U.S. Cl.
CPC .............. G06T 7/001 (2013.01); G06N 3/04 (2013.01); *G06T 2207/20081* (2013.01); *G06T 2207/20084* (2013.01); *G06T 2207/30148* (2013.01)

(58) Field of Classification Search
CPC .......... G06T 7/001; G06T 2207/20084; G06T 2207/30148; G06T 2207/20081; G06N 3/04
See application file for complete search history.

(56) References Cited

U.S. PATENT DOCUMENTS

| | | |
|---|---|---|
| 6,738,954 B1 | 5/2004 | Allen et al. |
| 9,739,783 B1 | 8/2017 | Kumar et al. |
| 9,934,364 B1 | 4/2018 | Kumar et al. |
| 2014/0268105 A1 | 9/2014 | Bills et al. |
| 2017/0032285 A1 | 2/2017 | Sharma et al. |
| 2017/0328983 A1 | 11/2017 | Volgyesi et al. |
| 2017/0337682 A1 | 11/2017 | Liao et al. |
| 2018/0330493 A1 | 11/2018 | Milligan |
| 2019/0005357 A1 | 1/2019 | Bhaviripudi et al. |
| 2019/0257767 A1* | 8/2019 | Shaubi ................ G06T 7/174 |

(Continued)

FOREIGN PATENT DOCUMENTS

| | | |
|---|---|---|
| CN | 106372390 A | 2/2017 |
| CN | 108564026 A | 9/2018 |

OTHER PUBLICATIONS

Brownlee, "Image Augmentation for Deep Learning With Keras," published online on Jun. 29, 2016, updated Mar. 2017, downloaded from https://machinelearningmastery.com/image-augmentation-deep-learning-keras/, 46 pages.

(Continued)

*Primary Examiner* — Ping Y Hsieh
(74) *Attorney, Agent, or Firm* — Seed Intellectual Property Law Group LLP

(57) ABSTRACT

A device includes image generation circuitry and convolutional-neural-network circuitry. The image generation circuitry, in operation, generates a digital image representation of a wafer defect map (WDM). The convolutional-neural-network circuitry, in operation, generates a defect classification associated with the WDM based on the digital image representation of the WDM and a data-driven model generated using an artificial wafer defect digital image (AWDI) data set and associating AWDIs with classes of a defined set of classes of wafer defects. A wafer manufacturing process may be controlled based on the classifications of WDMs.

33 Claims, 13 Drawing Sheets

(56) References Cited

U.S. PATENT DOCUMENTS

| | | | | |
|---|---|---|---|---|
| 2019/0294923 A1* | 9/2019 | Riley | ................... | G06K 9/6271 |
| 2019/0378260 A1* | 12/2019 | Brauer | ................... | G06T 7/001 |
| 2020/0134809 A1* | 4/2020 | Moioli | ................. | G06T 7/0004 |
| 2020/0151538 A1* | 5/2020 | Sha | ....................... | G06K 9/4628 |
| 2020/0161081 A1* | 5/2020 | Pathangi | ............... | H01J 37/222 |
| 2020/0193588 A1* | 6/2020 | Brauer | ................. | G06K 9/6269 |
| 2021/0073972 A1* | 3/2021 | Wu | ........................ | G06T 7/174 |

OTHER PUBLICATIONS

Nakazawa, "Wafer Map Defect Pattern Classification and Image Retrieval Using Convolutional Neural Network", *IEEE Transactions on Semiconductor Manufacturing* 31(2):309-314, May 2018.

Taylor et al., "Improving Deep Learning using Generic Data Augmentation," *IEEE Symposium Series on Computational Intelligence*, Nov. 18-21, 2018, Bangalore, India, 6 pages.

Wikipedia, "Generative Adversarial Network," downloaded from https://en.wikipedia.org/wiki/Generative_adversarial_network on Jan. 9, 2019, 3 pages.

Hsu, "Clustering Ensemble for Identifying Defective Wafer Bin Map in Semiconductor Manufacturing," *Mathematical Problems in Engineering 2015*:707358, 2015, (12 pages).

Nakata et al., "A Comprehensive Big-Data-Based Monitoring System for Yield Enhancement in Semiconductor Manufacturing," *IEEE Transactions on Semiconductor Manufacturing* 30(4):339-344, 2017.

Wu et al., "Wafer Map Failure Pattern Recognition and Similarity Ranking for Large-Scale Data Sets," *IEEE Transactions on Semiconductor Manufacturing* 28(1):1-12, 2015.

* cited by examiner

NEURAL NETWORK TRAINING DEVICE, SYSTEM AND METHOD

BACKGROUND

Technical Field

The present disclosure generally relates to training deep learning machines. For example, the present disclosure relates to training embedded systems implementing artificial neural networks (ANNs), such as convolutional neural networks (CNNs), for example, to classify wafer defect maps (WDMs).

Description of the Related Art

Various computer vision, speech recognition, and signal processing applications may benefit from the use of learning machines, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN may learn a variety of characteristics of faces such as edges, curves, angles, dots, color contrasts, bright spots, dark spots, etc. These features may be learned at one or more first layers of the DCNN. Then, in one or more second layers, the DCNN may learn a variety of recognizable features of faces such as eyes, eyebrows, foreheads, hair, noses, mouths, cheeks, etc.; each of which is distinguishable from the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN may even be taught in some cases to recognize the specific identity of a person. For example, a random image can be identified as a face, and the face can be recognized as Person_A, Person_B, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

DCNNs can be applied to manufacturing processes. For example, semiconductor wafers are generally manufactured using production lines. Each semiconductor wafer may include a plurality of chips, which are separated or cut from one another as part of the production process. The wafers may include physical defects which may cause one or more chips of the wafer to fail. Defects may include voids, craters, protrusions, bridges, particles, etc.

During the production process, wafers may be inspected at various points of the process to look for physical defects and to assess production quality. A wafer defect map (WDM) may be generated based on the inspection. A wafer defect map may be a text file which includes the coordinates of defects.

Defects may have causes which result in patterns in a wafer defect map. For example, particles in a clean room may be considered to have a random cause and may result in defects uniformly distributed on a wafer. Defects also may have specific geometries, such as specific arrangements of defects on a wafer which are consistent with a particular cause. For example, a misalignment of a wafer in a particular step performed on a particular machine may result in a wafer defect map with a pattern consistent with the cause of the defect. For example, a pattern consistent with a scratch may indicate machine handling is the cause of the defect in the WDM. The wafer defect maps may be examined to determine causes of defects based on patterns in the wafer defect maps. CNNs, such as DCNNs, may be trained to classify WDMs.

BRIEF SUMMARY

CNNs generate better predictions when trained using large data sets than they do when trained using small data sets. In addition, a high number of classes (e.g., 100 classes or more) may be desirable for certain applications, such as classifying wafer maps to identify manufacturing defects. Data sets also may be imbalanced (e.g., certain defect classes may have few actual images especially when compared to other defect classes). It also may be difficult to correctly label wafer maps which suffer from clarity defects. For example, scanning electron microscope (SEM) images may suffer from clarity issues. Small data sets and imbalanced data sets used for training can lead to problems, such as overfitting.

Data augmentation or resampling may be used to address small data sets and imbalanced data sets. For example, addition images may be generated using transforms and the CNN may be trained using the augmented data set, which includes both the original data set and the augmented data. However, these approaches may still be prone to overfitting, and may not cover all classes (such as a specific class missing from the original training data).

In an embodiment, an artificial data set is generated based on knowledge of the characteristics of the types or classes of images to be classified, e.g., knowledge of characteristics of images associated with particular classifications of wafer defects. The artificial data set may be generated manually (e.g., using python language or a GUI). Augmentation techniques may be employed on an artificial data set to generate an augmented artificial data set. Instead of using a sampled data set, an oversampled data set or an augmented sampled data set, an artificial data set which is generated from scratch based on knowledge of the characteristic of actual images (such as an augmented artificial data set) may be used to train the CNN. Then, actual images having known classes (e.g., wafer defect classes), may be used to evaluate the trained CNN. The process may be iterative. An embodiment facilitates training with a high number of classes, and testing indicates there is better accuracy in the predictions when an artificial generated data set (such as an augmented artificial data set) is used to train the CNN than there is when actual sampled data sets or augmented sampled data sets are used to train the CNN.

In an embodiment, a device comprises image generation circuitry, which, in operation, generates a digital image representation of a wafer defect map (WDM); and convolutional-neural-network (CNN) circuitry, which, in operation, generates a defect classification associated with the WDM based on the digital image representation of the WDM and a data-driven model generated using an artificial wafer defect digital image (AWDI) data set and associating AWDIs with classes of a defined set of classes of wafer defects. In an embodiment, the CNN circuitry, in operation, associates, based on the digital image representation of the WDM and the data-driven model, one or more labels and one or more tags with the WDM which are associated with a defect cause. In an embodiment, a tag identifies a machine associated with the defect cause. In an embodiment, the CNN circuitry includes one or more convolutional layers. In an embodiment, the CNN circuitry includes one or more layers which, in operation, introduce a non-linearity. In an embodiment, the CNN circuitry includes one or more pooling layers. In an embodiment, the CNN circuitry includes one or more fully connected layers. In an embodiment, in a training mode of operation, the CNN circuitry generates the data-driven model using the AWDI data set. In an embodiment, the device comprises: artificial image generation circuitry, which, in operation, generates the AWDI data set. In an embodiment, the generating the data-driven model includes providing layer information to a fully connected layer of the CNN circuitry. In an embodiment, images of the AWDI data set mimic characteristic patterns of images of WDMs associated with classes of wafer defects. In an embodiment, the AWDI data set includes, for each defined class of the set of classes of wafer defects, a same number N of AWDI images. In an embodiment, the data driven model associates AWDIs with root causes of wafer defects and the CNN circuitry includes an activation function, which, in operation, generates a label identifying a class of the defined set of classes associated with the WDM and a tag identifying a root cause associated with the WDM.

In an embodiment, a system comprises: one or more memories; and wafer-defect-map (WDM) classification circuitry coupled to the one or more memories, which, in operation, generates a defect classification associated with a WDM based on a digital image representation of the WDM and a data-driven model generated using an artificial wafer defect digital image (AWDI) data set and associating AWDIs with classes of a defined set of classes of wafer defects. In an embodiment, the WDM classification circuitry includes one or more convolutional layers, one or more pooling layers and one or more fully connected layers. In an embodiment, in a training mode of operation, the WDM classification circuitry generates the data-driven model using the AWDI data set. In an embodiment, the system comprises: artificial image generation circuitry, which, in operation, generates the AWDI data set. In an embodiment, the AWDI data set includes, for each defined class of the set of classes of wafer defects, a same number N of AWDI images. In an embodiment, the data driven model associates AWDIs with root causes of wafer defects and the WDM classification circuitry includes an activation function, which, in operation, generates a label identifying a class of the defined set of classes associated with the WDM and a tag identifying a root cause associated with the WDM. In an embodiment, the WDM classification circuitry, in operation, generates one or more control signals to control a wafer-production system based on defect classifications associated with one or more WDMs.

In an embodiment, a method comprises: generating a digital image representation of a wafer defect map (WDM); and generating a defect classification associated with the WDM based on the digital image representation of the WDM and a data-driven model generated using an artificial wafer defect digital image (AWDI) data set and associating AWDIs with classes of a defined set of classes of wafer defects. In an embodiment, the method comprises generating the data-driven model using the AWDI data set. In an embodiment, the method comprises: generating the AWDI data set. In an embodiment, the AWDI data set includes, for each defined class of the set of classes of wafer defects, a same number N of AWDI images. In an embodiment, the data driven model associates AWDIs with root causes of wafer defects and the generating the defect classification associated with the WDM comprises generating a label identifying a class of the defined set of classes associated with the WDM and a tag identifying a root cause associated with the WDM. In an embodiment, the method comprises: generating one or more control signals to control a wafer-production process based on defect classifications associated with one or more WDMs.

In an embodiment, a non-transitory computer-readable medium's contents configure a wafer defect map (WDM) classification system to perform a method, the method comprising: generating a digital image representation of a wafer defect map (WDM); and generating a defect classification associated with the WDM based on the digital image representation of the WDM and a data-driven model generated using an artificial wafer defect digital image (AWDI) data set and associating AWDIs with classes of a defined set of classes of wafer defects. In an embodiment, the method comprises generating the data-driven model using the AWDI data set. In an embodiment, the method comprises generating the AWDI data set. In an embodiment, the AWDI data set includes, for each defined class of the set of classes of wafer defects, a same number N of AWDI images. In an embodiment, the contents comprise parameters of the data-driven model. In an embodiment, the data driven model associates AWDIs with root causes of wafer defects and the generating the defect classification associated with the WDM comprises generating a label identifying a class of the defined set of classes associated with the WDM and a tag identifying a root cause associated with the WDM. In an embodiment, the method comprises: generating one or more control signals to control a wafer-production process based on defect classifications associated with one or more WDMs. In an embodiment, the contents comprise instructions which, when executed by the WDM classification system, cause the system to perform the method.

DETAILED DESCRIPTION

Figure 1:
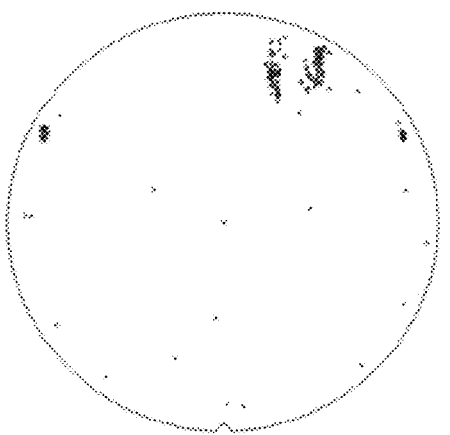
FIG. 1 depicts example actual or real wafer defect maps (WDMs).
Figure 1:
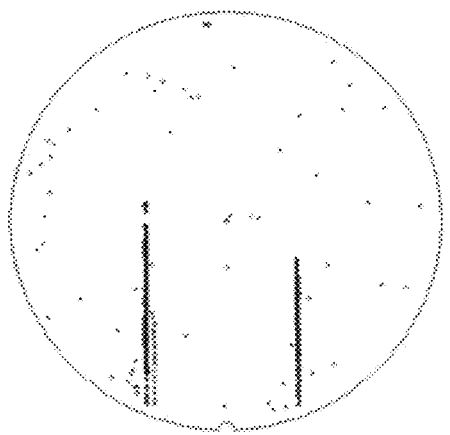
Figure 1:
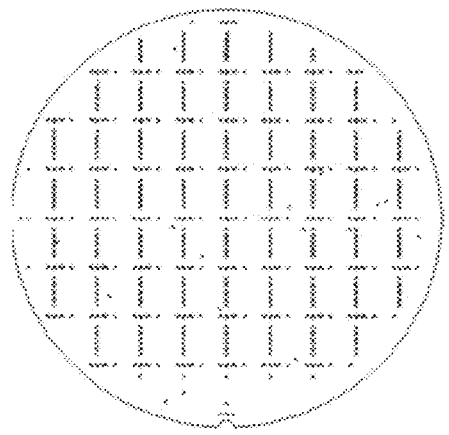

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, convolutional accelerators, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Example embodiments are discussed herein with reference to training of CNNs to classify WDMs and classification of WDMs using trained CNNs. The concepts disclosed herein may be applied in other contexts, such as training of CNNs to classify other inputs (e.g., other images) and classification of such inputs using the trained CNN.

During a wafer manufacturing process, a statistically significant sampling of wafers may be performed at various steps of the process. For example, after each deposition, etching, stripping, cleaning, etc., process. Individual inspection stations may be added to the processing line to sample the wafers. The wafers may be manually examined using visual inspection. Wafer defect maps may be generated and operators may examine the wafer defect maps and consider additional production parameters.

FIG. 1 illustrates example WDMs having defect patterns consistent with various types of manufacturing problems, including, from top to bottom, a pattern presenting fingerprints consistent with a problem due to an incorrect manipulation by an operator, a pattern that has geometric scratches consistent with a problem due to loading or unloading problem with a machine (e.g., a machine handling error), and a pattern presenting a grid or checkboard pattern consistent with a problem during a lithography phase. From the type of pattern in the image, it may be possible to identify the kind of defect (e.g., a scratch), the involved equipment (the particular piece of machinery), the specific process (e.g., etching), and the root cause (e.g., misalignment).

Visual inspection and classification of defects using microscopes may be performed. Based on the inspection, further processing of a lot of wafers or of subsequent lots of wafers may be determined (e.g., dispose of a current lot, proceed with processing of the current lot without restriction, adjust processing of current and subsequent lots, etc., and various combinations thereof). A manual inspection process, however, may be time consuming, may have inconsistencies among operators, and inaccuracies due to human errors, subjectivity and fatigue.

An automated inspection system may generate a wafer defect map containing coordinates of each defect of a wafer die of the sampling. The defect map may take the form of a data file, such as a Klarf™ file. A WDM may include defect patterns, such as a specific spatial arrangement of defects within the wafer. The patterns may be analyzed to determine a root cause of a defect or defects within the wafer.

For example, clustering algorithms may be employed. Clusters of wafers may be created with maximize intraclass similarity and maximize interclass diversity. Clustering may be viewed as related to template matching. Disadvantages of a clustering approach include the creation of lots of clusters, the lack of rotational invariance, and the practical inapplicability of clustering to certain defect classes.

In another example, feature extraction with classification based on defined features extracted from the WDMs may be employed. A feature is a discriminative characteristic that a classifier can learn to distinguish WDMs. Features can be Radon-transform based features, Hough-transform based features, geometry-based features, etc. Public labeled data sets may be used for training a classifier. The features, however, are pre-defined, and new features are needed to add new classes.

Deep-learning techniques also may be employed. However, conventionally such techniques are bound to the dimensions of the WDMs, do not distinguish between multiple classes, and may employ thousands of failure patterns and causes. It also may be difficult to avoid distortions introduced by transformations, which may make it difficult to apply overcorrection avoidance techniques.

In addition, the automated approaches discussed above are processor intensive, which may mean these approaches are impractical to implement in real time during a wafer fabrication process.

In an embodiment, WDMs may be generated from representative wafers (e.g., a statistically significant sampling) at various points during a wafer fabrication process. The WDMs are represented as image data and a deep neural network (DNN), such as a convolutional neural network (CNN), employs image classification techniques to identify root causes of defects associated with the wafers. The CNN classification techniques may be deep CNN classification techniques.

A CNN is a computational architecture that attempts to identify underlying relationships in a set of data by using a process that mimics the way the human brain operates. CNNs have the ability of adapting to changing inputs so that a network may produce a result without redesigning the output criteria. CNNs may be used, e.g., to extract patterns and detect trends that are too complex to be noticed by either humans or other computer techniques.

Figure 2:
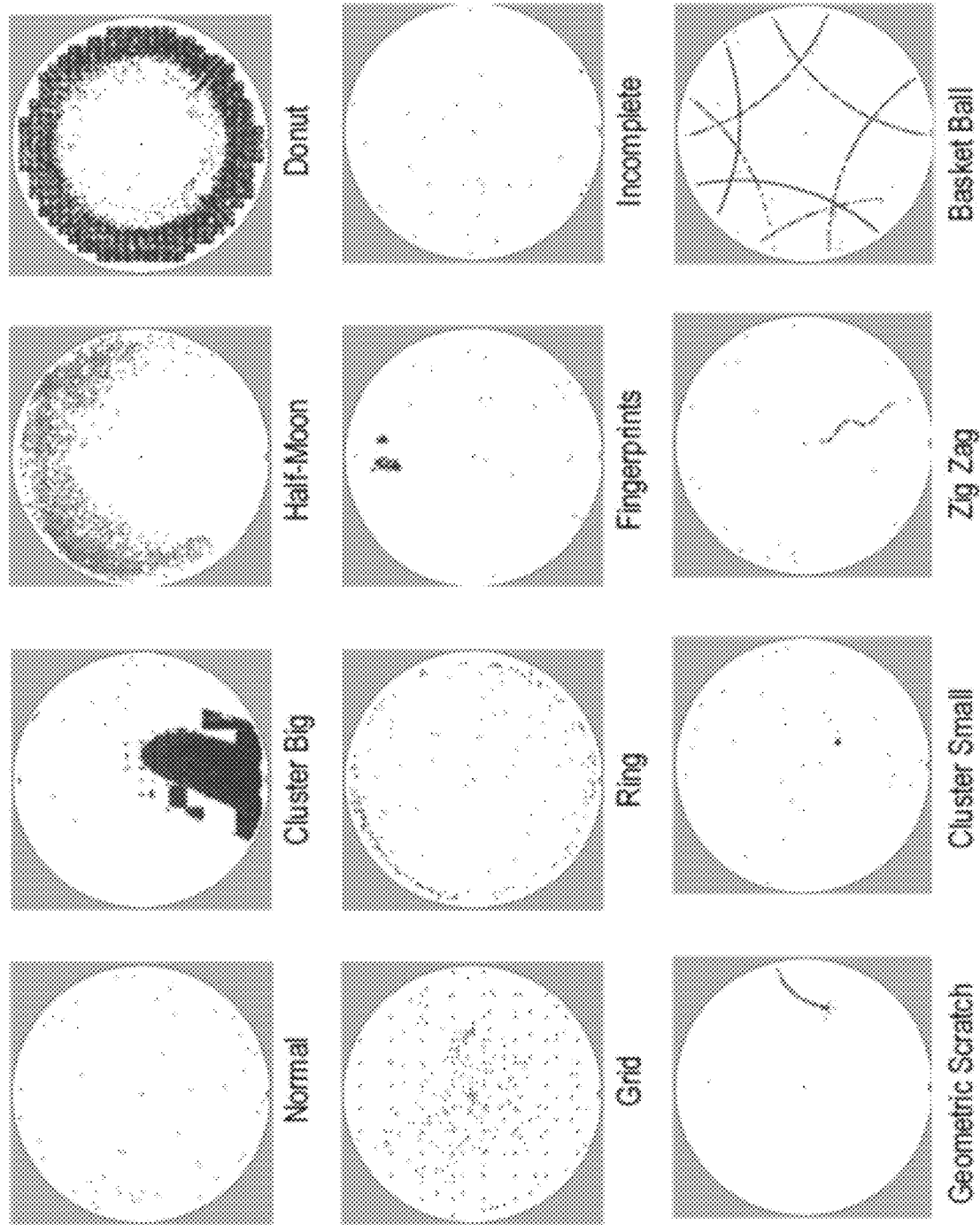
FIG. 2 illustrates an example set of classes into which WDMs may be classified.

Conventionally, a training set of actual or real WDMs is provided which has labels and may have tags. FIG. 2 illustrates an embodiment of a set of defined classes into which WDMs may be classified. As illustrated, the set of classes comprises twelve defined classes including a normal class, a big cluster class, a half-moon class, a donut class, a grid class, a ring class, a fingerprints class, an incomplete class, a geometric scratch class, a small cluster class, a zig-zig class, and a basketball class. The labels identify a class of a defined class of WDM classes (e.g., one of the twelve classes of FIG. 2). The tags identify a root cause associated with WDM of the training set (e.g., a particular problem with a particular machine), and may include other information as well, such as identifiers of the machines used to process the wafer.

Conventionally, the training set of WDMs comprises actual WDMs which may be augmented or oversampled to address imbalances in the number of samples of each class and overtraining issues. The WDMs are converted to images which are used to train the CNN. The CNN generates a data-driven model which matches an input WDM to a label corresponding to a class. In an embodiment, the training set also or instead trains the CNN to generate a data-driven model which matches an input WDM to a tag. A testing phase may be employed in which the CNN is tested with a new set of WDMs.

After the training (and testing), WDMs generated during a fabrication process are represented as image data and provided to the CNN. The data-driven model learned by the CNN is used to predict/identify defect root causes of defects associated with the WDMs generated during the fabrication process. For example, the CNN may predict a class (or a plurality of class) and a tag to associate with a WDM produced during a fabrication process using the trained model. In another example, the CNN may predict/identify a class (or a plurality of classes) to associate with a WDM generated during the fabrication process based on the trained model, and use a similarity test to associate a tag of a training WDM having the predicted class(es) which is most similar to the WDM generated during the fabrication process with the WDM generated during the fabrication process. Associating a tag of a most similar training WDM with a WDM generated during a fabrication process facilitates using tags which change after the training (e.g., as new machines are deployed), and avoiding problems which may arise in the generation of training data sets (e.g., only a few machines may generate defective WMDs, leading to a training set of tags which is too small).

The training process of a CNN, such as a deep CNN, to predict classes may produce a model which suffers from overfitting (e.g., the CNN learns from the training set so well that the CNN cannot generalize to new data), or from over-prediction of the majority class (e.g., the CNN is more likely to predict the majority class and yet maintain a high accuracy rate). In addition, representing the WDMs as images can result in large data files (e.g., 20,000 by 20,000 pixel images), which may be difficult to analyze using a CNN. Embodiments may employ various techniques to address or reduce the impact of such issues.

Figure 3:
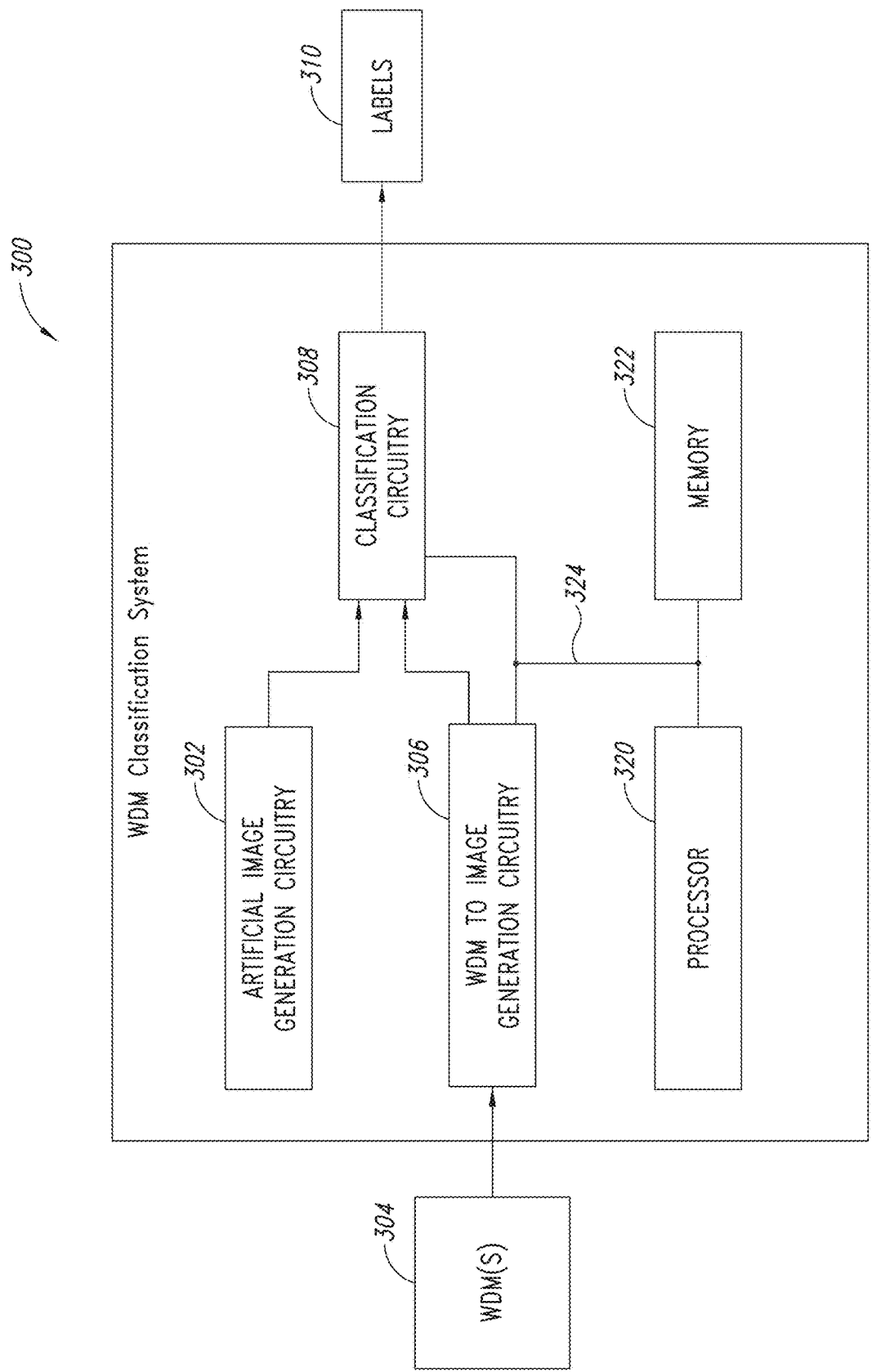
FIG. 3 is a functional block diagram of an embodiment of a WDM classification system.

FIG. 3 illustrates an embodiment of a wafer defect map classification system 300 which automatically classifies wafer defect maps. In a training phase of an embodiment, artificial or imitation wafer defect digital images (AWDIs) are generated by artificial image generation circuitry 302, or retrieved (e.g., from the memory 322 or from an external memory via an interface (not shown)), as discussed in more detail elsewhere herein. The artificially created AWDIs have labels and may have tags (e.g., generated in view of the analysis of the particular production process and the noted characteristic patterns of real WDM images). The AWDIs may be generated, for example, using python language, a graphical user interface, etc. Real WDMs may be studied to identify patterns associated with the WDMs. Artificial images may be generated with random shapes using Bezier curves. An iterative process may be employed to refine the artificial training data set, as discussed in more detail herein. Data augmentation techniques may be employed using images of a set of AWDIs to generate an augmented set of AWDIs.

WDM to digital image generation circuitry 306 generates a set of digital images from a set of WDMs 304 during a classification or testing phase. Digital images are analyzed by classification circuitry 308, which may comprise, for example, a deep CNN. During the training phase, a data driven model associating WDMs with WDM defect classes (and root causes) is learned by the classification circuitry 308 based on the AWDIs generated by the artificial image generation circuitry. During a test or a use phase, a set of labels and tags 310 which have a best match to the set of actual WDMs 304 according to the data-driven model is output by the classification circuitry 308. In some embodiments, the set of tags may be output, while the set of labels is used internally by the CNN (e.g., to determine a tag associated with a training WDM best matching an input WDM). Testing of embodiments shows that using a data driven model associating AWDIs with WDM defect classes (and root causes) may provide better results than using a data driven model associating WDMs with WDM defect classes (and root causes).

As illustrated, the system 300 comprises one or more processors 320, one or more memories 322, which may be used to implement the functionality of the artificial image generation circuitry 302, the WDM to image generation circuitry 306 and the classification circuitry 308. The system 300 as illustrated also comprises one or more bus systems 324 (a portion of which is omitted for ease of illustration), and may include additional circuitry, such as power supplies, interfaces, etc., which are omitted for ease of illustration.

The system 300 may include more components than illustrated, may include fewer components that illustrated, may combine or split components in various manners, and may have configurations other than the illustrated configuration. For example, in some embodiments, AWDIs output by the artificial image generation circuitry 302 may be provided to the WDM to image generation circuitry 304 for processing before being provided to the classification circuitry 308. In another example, in some embodiments the artificial image generation circuitry 302 may be omitted, for example when the AWDI training data set is stored in the memory 322, or when the system 300 is to operate only in a classification mode. In another example, the system may include data augmentation circuitry to augment AWDIs provided to the classification circuitry 308.

Figure 4:
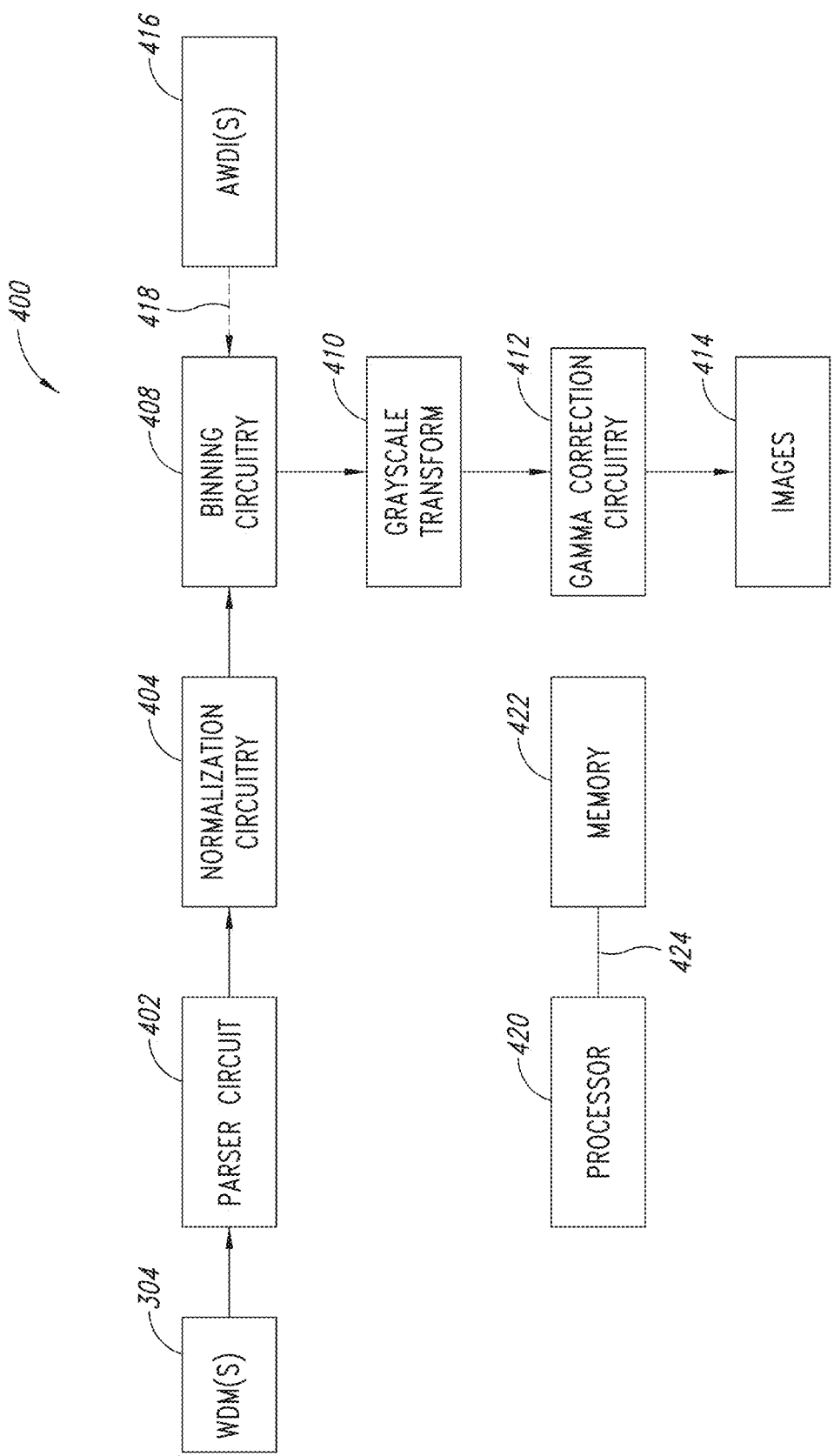
FIG. 4 is a functional block diagram of an embodiment of a WDM to digital image generation system.

FIG. 4 illustrates an embodiment of a WDM to image generation system 400, which may be employed, for example, as the WDM to image generation circuitry 306 in an embodiment of the WDM classification system 300 of FIG. 3. The image generation system 400 as illustrated includes parser circuitry 402, normalization circuitry 404, binning circuitry 408, grayscale transform circuitry 410, and gamma correction circuitry 412. The system 400 receives a set of WDMs 304 as an input and outputs a set of images 414. As illustrated, the system 400 comprises processing circuitry such as one or more processors 420, and one or more memories 422, which may be used to implement the functionality of the parser circuitry 402, normalization circuitry 404, binning circuitry 408, grayscale transform circuitry 410 and gamma correction circuitry 412. The system 400 as illustrated also comprises one or more bus systems 424, and may include additional circuitry, such as power supplies, interfaces, etc., which are omitted for ease of illustration.

In an embodiment, the input set of WDMs 304 contains a set of text files in which the coordinates of defects are stored (e.g., klarf files). The parser circuitry 402, in operation, opens the text files and produces a set of comma separated value (csv) files. The set of csv files may preserve the context information.

The normalization circuitry 404, in operation, normalizes the coordinates with respect to the center of the wafer, and with respect to the radius of the wafer. For example the following relationships may be employed to generate normalized coordinates x', y' from the input coordinates, $$x=(x_{index}x_{die}+x_{rel})-x_c$$

$$y=(y_{index}y_{die}+y_{rel})-y_c$$

$$x'=x/\text{radius}$$

$$y'=y/\text{radius}$$

where $x_{index}$ and $y_{index}$ are the number of dies to count in the horizontal and vertical directions from a die that contains the center of the wafer; $x_{rel}$, $y_{rel}$ are defect coordinates with respect to a bottom-left point of a die identified by $x_{index}$, $y_{index}$; $x_{die}$, $y_{die}$ are the size of the die (width, height), and can be viewed as a die pitch; and $x_c$, $y_c$ are the coordinates of the center with respect to a bottom-left point of the die containing the center.

Normalization facilitates classifying WDMs of wafers of various sizes in a manner which does not need to consider the size of the wafer or the resolution of the WDM.

The binning circuitry 408, in operation, quantizes the WDMs into images. Data binning or bucketing is a data processing technique used to group continuous input data into a smaller number of bins or intervals of discrete values. The output size depends on how many bins are employed. More bins means that a region considered for each bin is smaller. Binning may facilitate reducing the amount of data to be processed by the classification circuitry (see classification circuitry 308 of FIG. 3) and may reduce the size of the output image. The original data values of a WDM (or of an AWDI in a training phase) are replaced by a count of defects that fall into a small region, or bin, of the WDM. Fixed binning, where the size of each bin is fixed, or adaptive binning may be employed. In fixed binning, the wafer map may be divided into a uniformly spaced grid.

In adaptive binning, the wafer is split into intervals of different dimensions with the expected value of defects constant in each bin. The size of each bin is inversely proportional to the density of defects and smaller bins are used to describe high-density defect regions of the WDM, which results in higher resolution images. Adaptive binning reflects that defects may be more dense in some regions of the WDMs (e.g., at the center and at the edges), and creates smaller bins where the defect density is higher. A more general solution, which may be applied in an embodiment, is to directly learn the binning layout to maximize the defect-detection performance on a given training set. In an embodiment, the learning problem may be formulated as learning the number of bins or the density values in each bin. Adaptive binning facilitates detecting some types of defects, such as the incomplete class, which may have defects at positions at the wafer borders, such as fixed positions.

The grayscale transform circuitry 410, in operation, transforms the image generated by the binning circuitry 408 into a grayscale image with values in the range of [0, 1]. A saturation threshold s is set, for example based on the output size (a number of bits available to represent a bin count). For example, the saturation threshold may be set at 255. Values of an image (e.g., a count value of a bin) generated by the binning circuitry which are above the saturation threshold s are replaced by 1. Values below the saturation threshold s are linearly scaled. The output of the grayscale transformation circuitry is a grayscale image.

The gamma correction circuitry 412 enhances the contrast by, in operation, applying a transform to each value. For example, the following transform may be applied:

$$V=v^\gamma, \gamma \leq 1$$

where v is a count value of a bin, gamma γ is a transform parameter, and V is a transformed count value of a bin. In an embodiment, the saturation parameter s and the transform parameter γ may be manually selected. In an embodiment, the classifier may learn to select its own thresholds. For example, the saturation parameter s may be set to 255, and additional convolutional layers (e.g., two layers) may be added to the CNN so that the model learns a contrast enhancement function. Having the model learn the contrast enhancement function from the data facilitates using different images sizes, as different thresholds do not need to be studied for manual selection using different image sizes.

The output of the WDM to digital image generation system is a set of one or more images, which are provided as an input to a classification system, such as the classification circuitry 308 of FIG. 3.

Embodiments of the image generation system 400 may comprise more or fewer circuits than illustrated, and circuits of the system 400 may be combined and separated into additional circuits in various manners and reconfigured in various manners. For example, some embodiments of the image generation system 400 may omit the gamma correction circuitry 412 and image enhancement, if desired, may be performed in a classification system such as the classification circuitry 308 of FIG. 3. Some embodiments may perform image enhancement in both a WDM to image generation system and a classification system. In another example, in a training or testing phase, AWDIs 416, e.g., generated by the artificial image generation circuitry 302 of FIG. 3 or retrieved from memory, may be processed by the system 400 before being provided to the classification circuitry 308. For example, one or more of the binning circuitry 408, the grayscale transform circuitry 410, or the gamma correction circuitry 412 of the image generation system 400 may process images generated by the artificial image generation circuitry 400 or AWDIs retrieved from the memory 322, 422, as illustrated by the dashed line 418 in FIG. 4.

Figure 5:
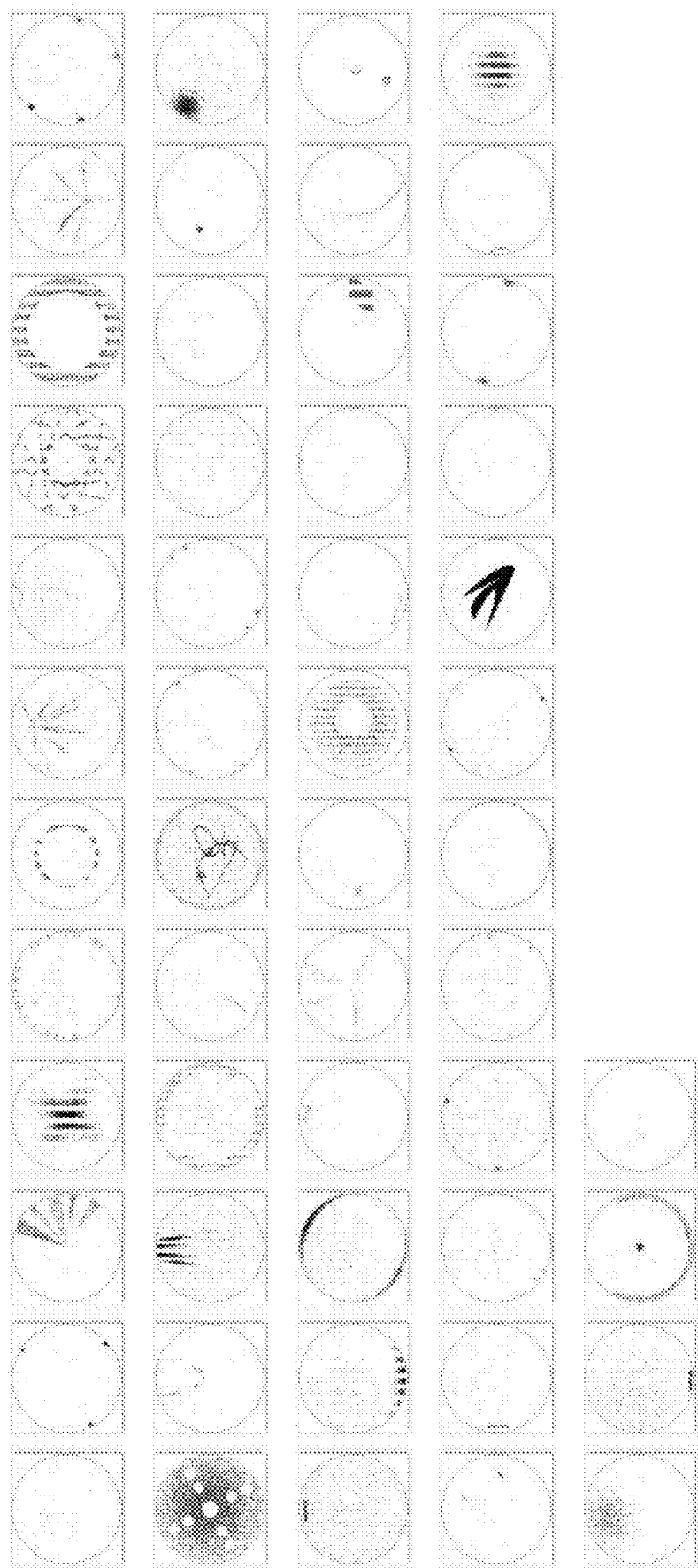
FIG. 5 illustrates an example set of classes of artificially generated artificial wafer defect digital images (AWDIs).

FIG. 5 illustrates example classes of AWDIs that may be employed to train a WDM classification system, such as the classification system 300 of FIG. 3. As illustrated, fifty-two classes of artificial images have been coded. For classifying wafer defect maps, it may be desirable to have 100 artificial image classes or more. For each coded class, a plurality of AWDI images, for example, 2000 images, may be generated. In practice, obtaining already labeled wafermaps of actual images can be difficult. Generating artificial AWDIs facilitates generating a large training data set even for classes having only a few real images available. The same number of artificial images may be generated for each class, which facilitates training with a balanced data set. A large (and balanced) data set facilitates avoiding overfitting and training with images representing all the potential cases of a specific class. An initial set of AWDIs may be generated, and augmented using augmentation techniques (e.g., transforms) to generate additional AWDIs for the AWDI training set.

Figure 6:
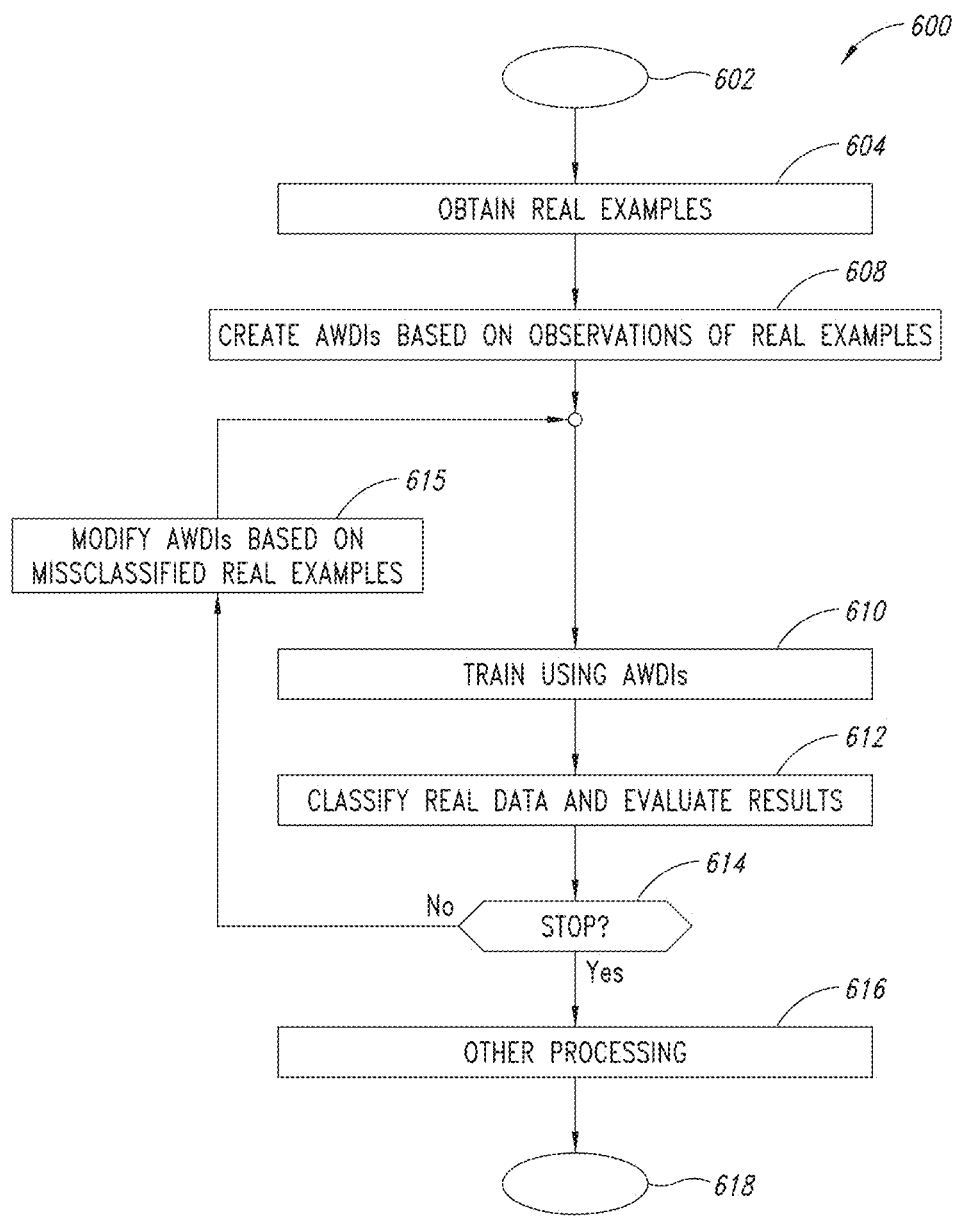
FIG. 6 illustrates an embodiment of a method of training a classifier using an AWDI data set.
Figure 10:
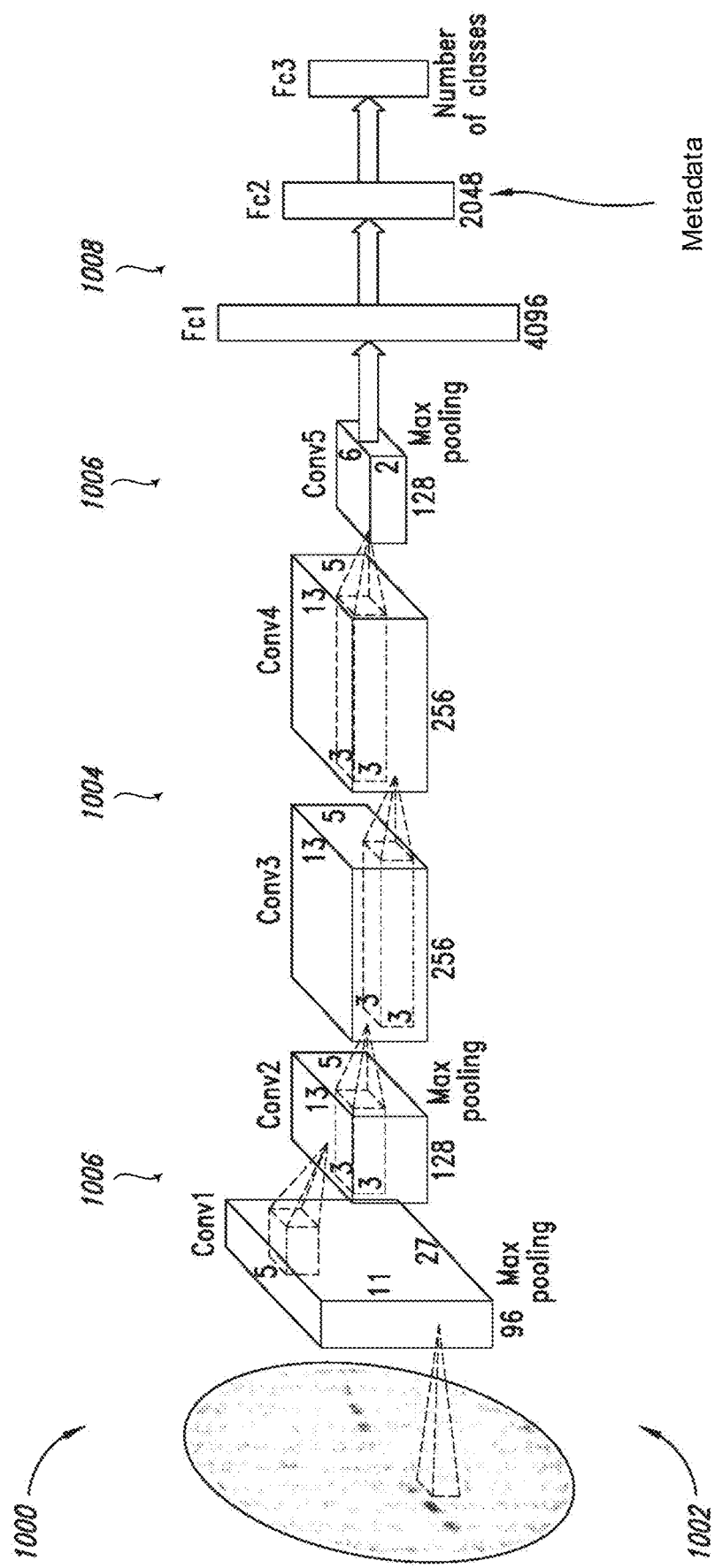
FIG. 10 is a functional block diagram of an embodiment of a WDM image classification system.

FIG. 6 illustrates an example embodiment of a method 600 of training a classifier using an AWDI data set, which may be employed, for example, by the system 300 of FIG. 3 or the system 1000 of FIG. 10. The method 600 starts at 602. The method 600 may be started, for example, as part of a wafer manufacturing quality control process. The method 600 proceeds from 602 to 604.

At 604, the method 600 obtains real examples of wafer defect maps for a plurality of defect classes. The real examples may be obtained from, for example, a wafer manufacturing system. The method 600 proceeds from 604 to 608.

At 608 AWDIs are created for each class based on observations of the real examples. The AWDIs may be generated based on the observations of patterns of the defect classes. Python language, a graphical user interface, etc., may be employed to generate the AWDIs which artificially mimic the patterns of the actual WDMs. The use of oversampling of actual data samples is avoided. As discussed below, the process may be iterative, and with a little practice, large AWDI data sets may be generated which provide very accurate results. For example, a dataset having 52 classes with 2000 images in each class may be created. Artificial images may be generated with random shapes using Bezier curves. Data augmentation techniques may be employed to generate additional artificial images from an initial set of artificial images. The method proceeds from 608 to 610.

At 610, the method 600 trains the classification system using the AWDIs without employing any real image data or transformed real image data. The method 600 proceeds from 610 to 612. At 612, the method 600 processes real data using the trained classifier and evaluates the results to determine how accurately the trained classifier classified the real data. Because real data is not used in the training at 610, all of the real data may be used to evaluate the classifier at 612. A more accurate evaluation of the model is facilitated because the classifier was not trained using the real data. The method proceeds from 612 to 614.

At 614, the method 600 determines whether the trained classifier is sufficiently accurate that the training may be considered complete and stopped. This may be done for each class, for a group of classes, or for all of the classes. Statistical analysis may be employed. When it is determined at 614 that the training is not sufficiently accurate and the training should not be stopped (No at 614), the method proceeds to 615, where the AWDIs are modified, for example, based on real examples which have been misclassified. For example, the results may indicate that a new class should be added, that the shapes used to mimic patterns of a particular class should be modified, etc. The method 600 proceeds from 615 to return to 610.

When it is determined at 614 that the training is complete (Yes at 614), the method 600 proceeds to 616, where further processing associated with the training may be performed, such as storing weights and parameters associated with the classifier. The method 600 proceeds from 616 to 618, where further system processing may occur.

Embodiments of methods of training a classifier may contain additional acts not shown in FIG. 6, may not contain all of the acts shown in FIG. 6, may perform acts shown in FIG. 6 in various orders, and may be modified in various respects.

Figure 7:
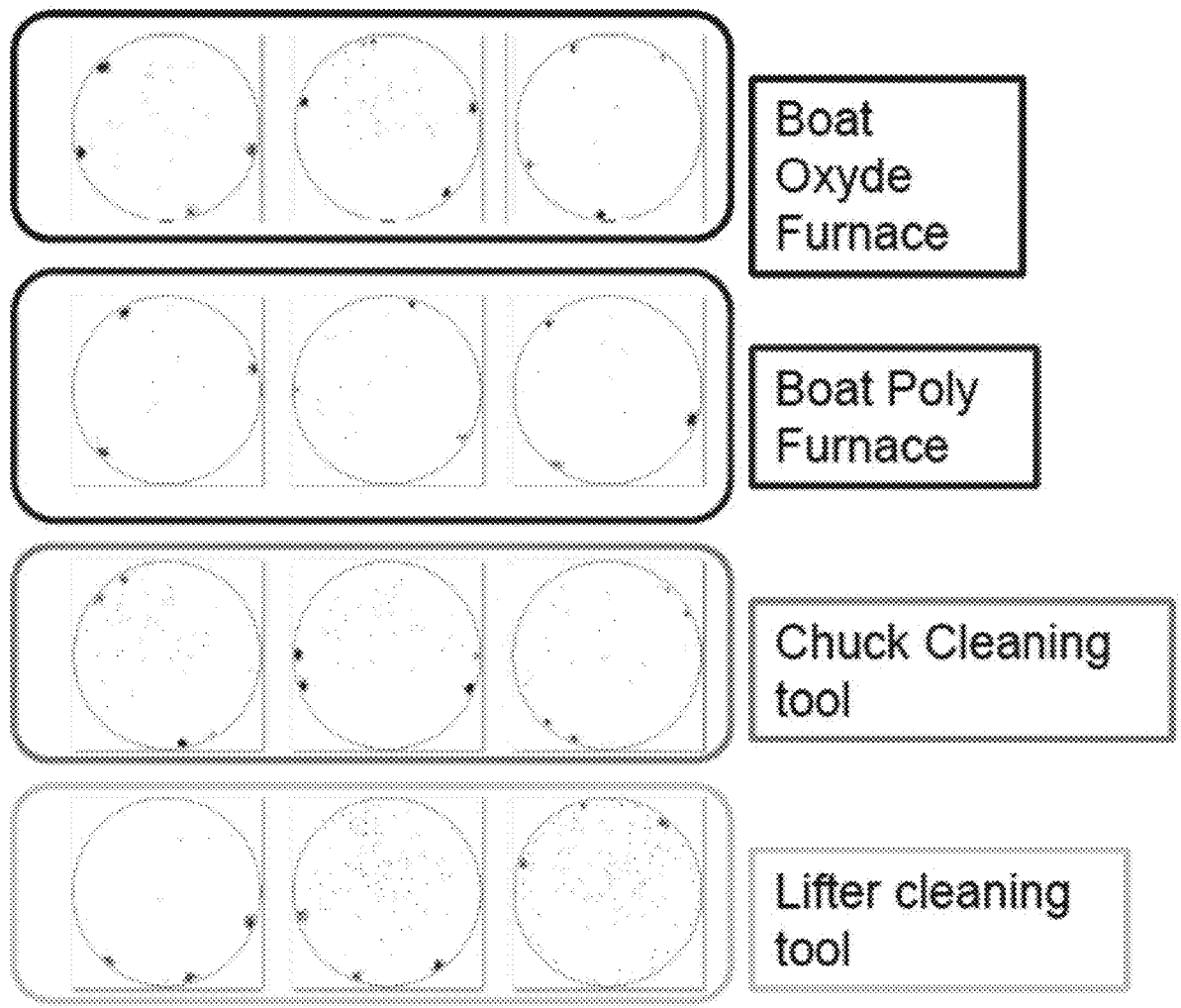
FIG. 7 illustrates example wafer defect patterns in particular cases.

FIG. 7 illustrates example patterns that may be identified in real images and used to generate artificial images in an AWDI data set. CNN classifiers are very good at finding localized patterns associated with particular cases, or boat patterns, in a data set. As illustrated, the localized patterns include defect patterns associated with various boats, including defect patterns associated with an oxide furnace, defect patterns associated with a poly furnace, defect patterns associated with a chuck cleaning tool and defect patterns associated with a lifter cleaning tool. Using AWDIs instead of real images as the training data facilitates associating multiple classes (boats) with a piece of machinery.

Figure 8:
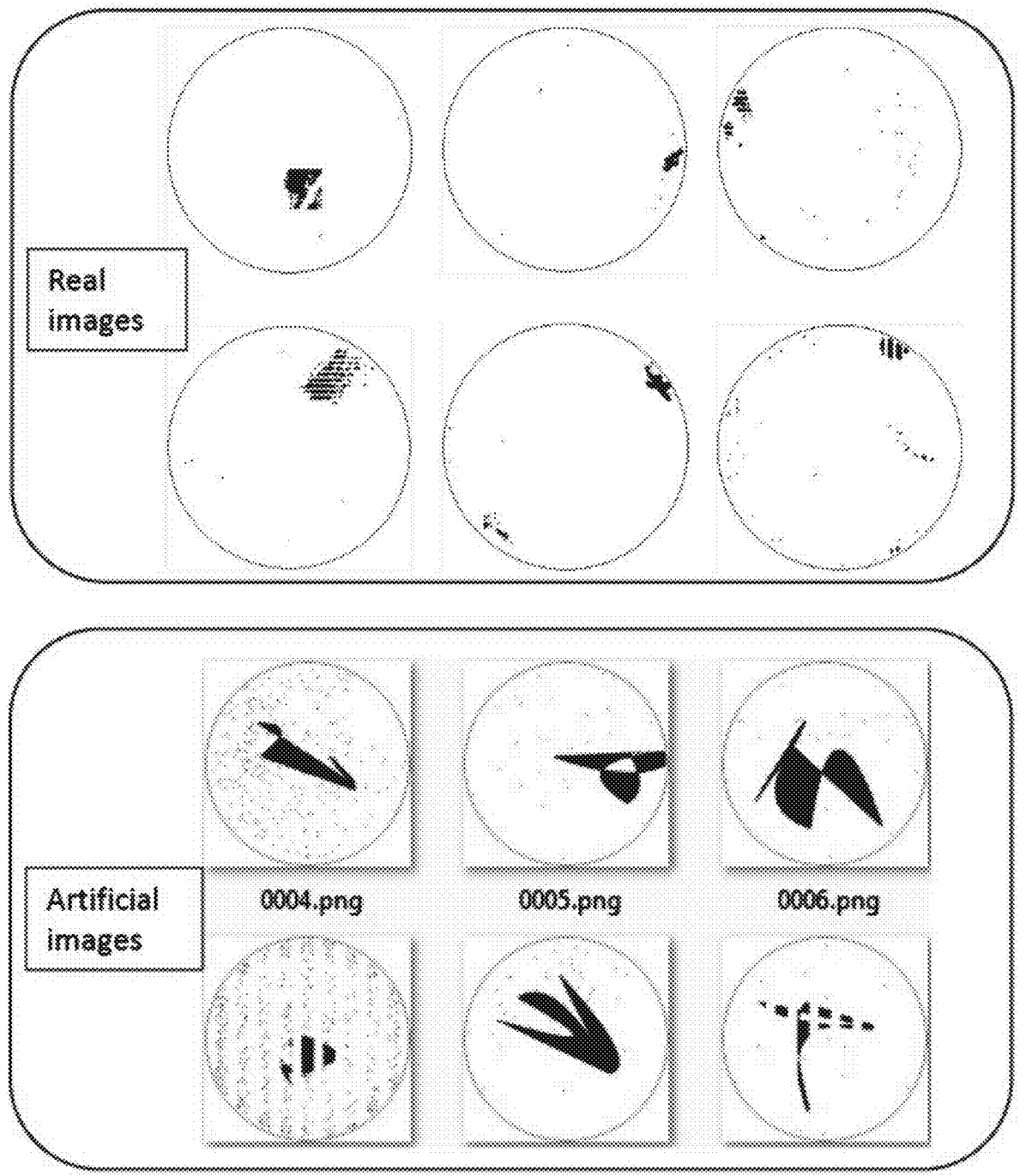
FIGS. 8 and 9 illustrate example real wafer defect image patterns and example artificial wafer defect images generated based on an evaluation of the real wafer defect images.

FIG. 8 illustrates example patterns that may be identified in real images and used to generate artificial images in an AWDI data set. As illustrated, the localized patterns include defect patterns associated with fingerprints or an out-of-focus field. The distribution of the patterns is not Gaussian, like clusters. The border between inside the pattern and outside the pattern is abrupt. Artificial images with specific shapes as shown were developed to mimic the patterns in the real images using Bezier curves. The results of training using the images were good.

Figure 9:
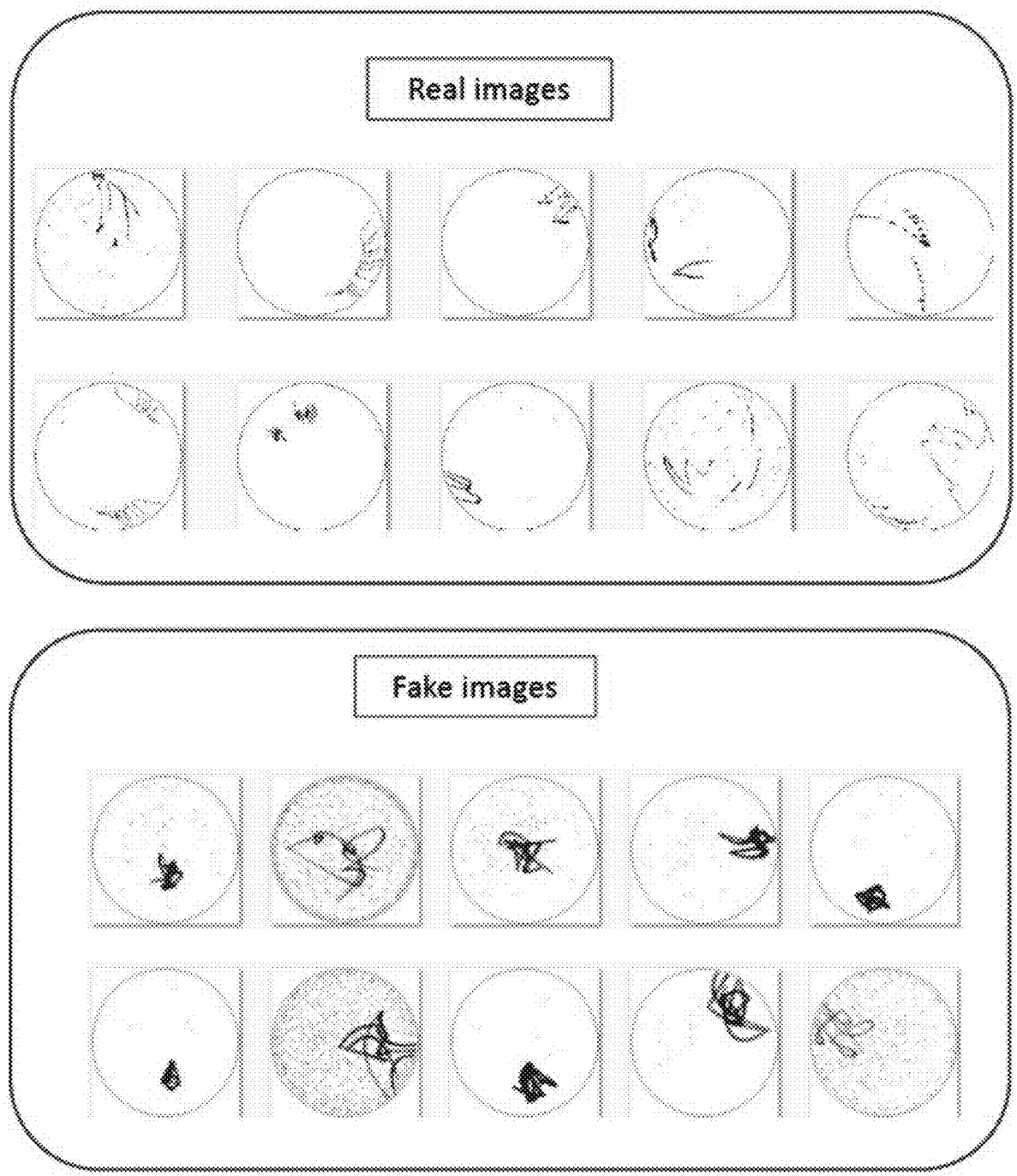

FIG. 9 illustrates example patterns that may be identified in real images and used to generate artificial images in an AWDI data set. As illustrated, the localized patterns include defect patterns associated with an unknown defect class. The distribution of the patterns is not Gaussian, like clusters. The border between inside the pattern and outside the pattern is abrupt. The artificial images labeled as representing the unknown class do not need to be very close to the real images, as long as the random shapes or patterns used are not present on any other class in the AWDI training set.

FIG. 10 illustrates an embodiment of an image classification system 1000, which may be employed, for example, as the classification circuitry 308 in an embodiment of the WDM classification system 300 of FIG. 3. The image classification system 1000 may be configured to operate in a plurality of phases, including a training phase, a testing phase and a classification phase. Some embodiments may store models trained using AWDIs and, in operation, employ only the classification phase.

The image classification system 1000 as illustrated comprises a deep neural network 1002 having a plurality of layers, including convolutional layers 1004 (Conv3, Conv4), max pooling convolutional layers 1006 (Conv1, Conv2, Conv5), and fully connected layers 1008 (Fc1, Fc2, Fc3). Other layers (not shown) may be employed, such as dropout layers and an activation function. In a training phase, the system 1000 receives AWDIs including associated labels and optionally tags. In a testing and classification phase, the system receives WDMs, which may include some associated tag information, such as the machines used to process the wafer. Typically, in the testing and classification phase, the labels identifying a defect class and the tag information identifying a root defect cause would be missing. In the training phase, the WDM classification system 1000 generates, based on the labeled AWDI training data, a data driven model mapping input AWDIs to labels identifying classes and, in some embodiments, to tags associated with root defect causes. In the testing and classification phases, the WDM classification system 1000 outputs a set of labels and tags associated with the input WDMs. The system 300 of FIG. 3 may be used to implement the WDM classification system 1000, including the functionality of the layers of the WDM classification system 1000.

A convolutional layer comprises a small matrix sliding over an input image, and, in operation, may have a kernel size of, for example, 3×3, and respective dimensionalities of an output space of 32, 64 and 128 (e.g., the number of output filters in the convolutions are respectively 32, 64 and 128). Training may be accelerated by introducing non-linearity. The max pooling convolutional layers 1006, in operation, may downsample, reducing the parameters and addressing overfitting.

The fully connected layers 1008, in operation, connect every neuron in one layer to every neuron in another layer, and determine which features most correlate to one or more particular classes. The fully connected layers 1008 receive an input volume (the output of the preceding layer) and output an m-dimensional vector, where m is the number of classes that the model has available to choose from. In the example of FIG. 5, m is fifty-two.

Embodiments of the system 1000 may comprise more or fewer layers and circuits than illustrated, and layers and circuits may be combined and separated into additional layers and circuits in various manners. For example, other types of pooling layers may be employed, such as average pooling layers.

In some embodiments, the system 1000 may be a multi-input CNN where metadata may be provided during the training phase, the inference phase, the testing phase, the classification phase, and various combinations thereof, to improve the accuracy of the model and of the predictions. For example, layer of inspection information, type of inspection information, etc., and various combinations thereof, may be provided to a fully connected layer, such as layer Fc2, as shown by the metadata input line to Fc2 in FIG. 10).

Layer of inspection information (e.g., information indicative of the conditions of the inspection of a wafer associated with a WDM or with an AWDI, such as information indicative of a machine or of a process stage of a wafer manufacturing process) indicates an association between an inspection layer and one or more defect classes of the set of defined defect classes. In other words, the inspection information indicates to a layer of a CNN (for example, Fc2 of FIG. 10) that potentially a specific defect class may be determined at the layer. For example, when a Klarf file or other representation of a WDM (or AWDI) is being generated, layer of inspection information may be generated and included in the klarf file based, for example, on a point in the manufacturing process at which the WDM is generated (or which the AWDI is intended to imitate). For example, if a particular machine is known to produce certain type of manufacturing defects, images generated after processing by that machine may be tagged (e.g., in the Klarf file) to indicate defect patterns corresponding to those defects may be detected at certain layers of a CNN, such as Fc2 in the CNN or deep neural network 1002 of FIG. 10. The information in the tag is employed by the CNN 1002 at Fc2, to indicate to the CNN that the defect pattern may be found at the Fc2 layer.

Figure 11:
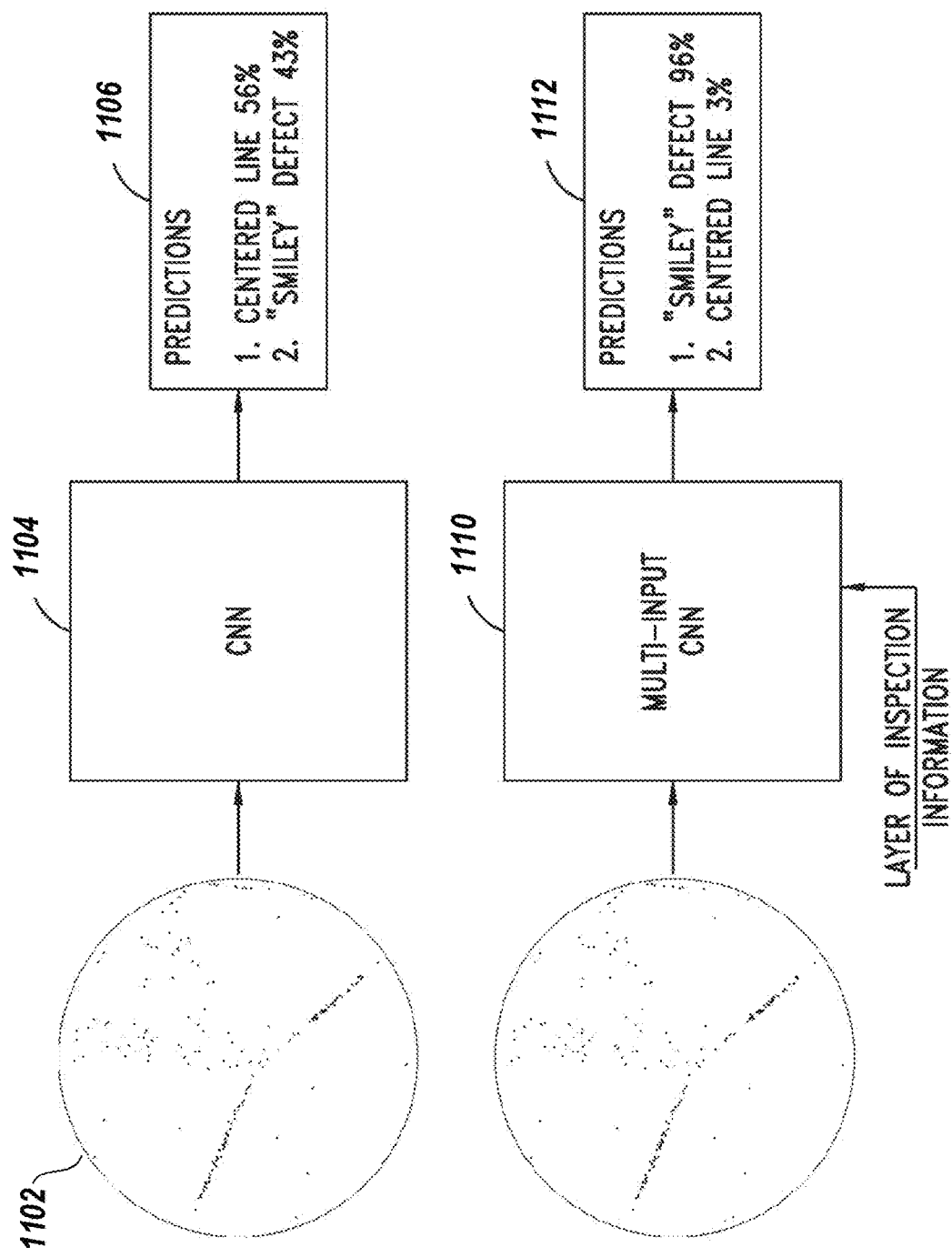
FIG. 11 illustrates results of predictions in which layer of inspection information is not provided to a fully connected layer, and in which layer of inspection information is provided to a fully connected layer.

FIG. 11 illustrates an example of an improvement in prediction accuracy that may occur when layer of inspection information is provided to a fully connected layer in an embodiment. In FIG. 11, when an image 1102 corresponding to a "smiley" defect (e.g., a digital image representation of a WDM in classification mode, testing mode, or training mode in some embodiments, an AWDI in a training mode in some embodiments) is provided to a CNN 1104 (e.g., the image classification system 1000 of FIG. 10) without providing layer of inference information, the accuracy of the prediction 1106 is low, as illustrated, 43%. In contrast, when layer of inspection information is provided to a multi-input CNN 1110, the accurate of the prediction 1112 is much higher, 96%.

Figure 12:
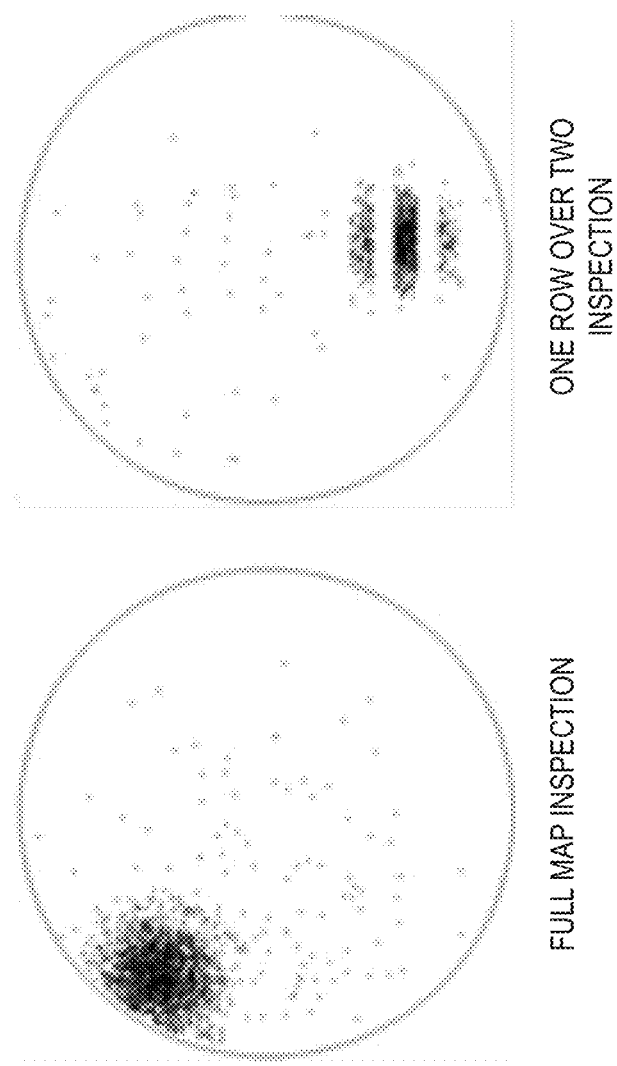
FIG. 12 illustrates example types of inspection that may be employed in an embodiment.

Type of inspection information indicates to a layer of a CNN, such as layer Fc2 of FIG. 10, that a particular type of inspection is to be performed, e.g., a full map inspection, one row over two rows, etc. FIG. 12 illustrates a full map inspection and a one row over two rows inspection. Indicating a one row over two inspection indicates to the CNN that the inspection provides only a partial view of a defect pattern. The type of inspection information may be determined, for example, when an image is generated, at run time based on user input, etc. One row over two scanning may be selected, for example, to save processing resources when the prediction results would be sufficiently accurate without a full map inspection.

Figure 13:
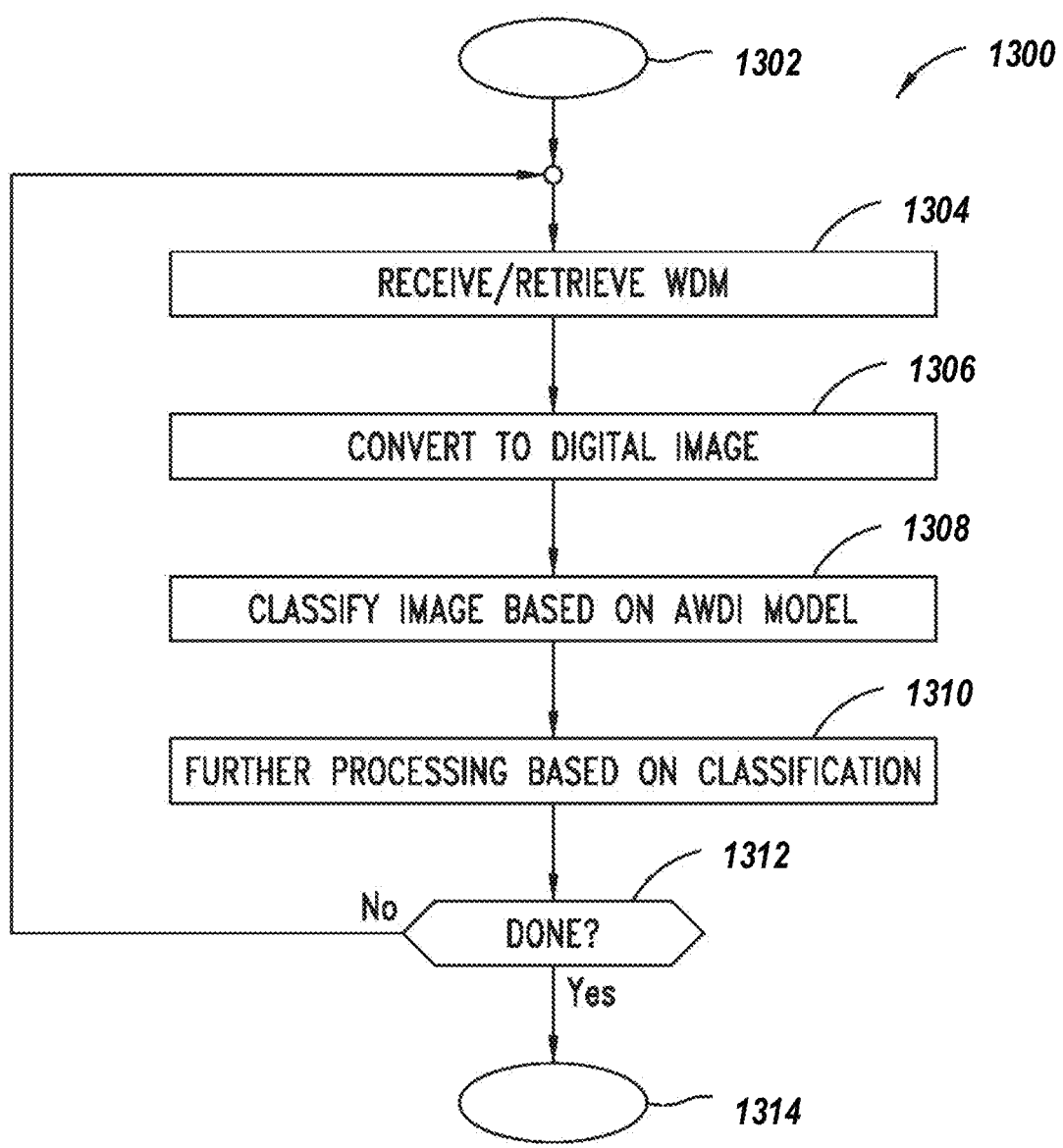
FIG. 13 illustrates an embodiment of a method of classifying WDM images using a classifier trained with an artificially generated AWDI data set.

FIG. 13 illustrates an embodiment of a method 1300, which may be employed, for example, by the embodiment of the system 300 of FIG. 3, by the embodiment of the system 1000 of FIG. 10, etc., to classify WDMs. The method 1300 starts at 1302. The method 1300 may be started, for example, as part of a wafer manufacturing quality control process. The method 1300 proceeds from 1302 to 1304.

At 1304, the method 1300 receives or retrieves a WDM. The WDM may be generated by a wafer manufacturing quality control system or process. The method 1300 proceeds from 1304 to 1306.

At 1306, the WDM is converted into a digital WDM image, for example by using the WDM to image generation circuitry 306 of FIG. 3 or the system 400 of FIG. 4. The method 1300 proceeds from 1306 to 1308.

At 1308, the method 1300 classifies the image based on a model generated using an AWDI data set. This may be done, for example, by using a classification system, such as the classification system 300 of FIG. 3 or the system 1000 of FIG. 10, trained using an AWDI data set, for example, trained using the method 600 of FIG. 6. The method 1300 proceeds from 1308 to 1310.

At 1310, the method 1300 optionally performs further processing based on the classification of the image. For example, when the image is classified into particular classes, a warning signal may be generated. In another example, a count of images in the class may be incremented, and further action taken when the count exceeds a threshold value. Statistical analysis may be performed in determining whether to perform further processing based on the classification of the image. The method proceeds from 1310 to 1312.

At 1312, the method 1300 determines whether the classification of WDMs is finished (e.g., whether there are additional WDMs to process). When it is determined at 1312 that classification of WDMs is not finished, the method 1300 returns to 1304 to receive or retrieve the next WDM. When it is determined at 1312 that the processing of WDMs is finished, the method 1300 proceeds to 1314, where further processing, such as a return of the results of classifying a set of WDMs, may be performed.

Embodiments of methods of classifying WDMs may contain additional acts not shown in FIG. 13, may not contain all of the acts shown in FIG. 13, may perform acts shown in FIG. 13 in various orders, and may be modified in various respects. For example, the method 1300 may perform act 1310 after a set of WDMs is processed or periodically, instead of or in addition to performing act 1310 individually for each WDM. In another example, the method 1300 may process WDMs in parallel, etc.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    image generation circuitry, which, in operation, generates a digital image representation of a wafer defect map (WDM); and
    convolutional-neural-network (CNN) circuitry, which, in operation, generates a defect classification associated with the WDM based on the digital image representation of the WDM and a data-driven model generated using training data consisting of an artificial wafer defect digital image (AWDI) data set associating AWDIs with classes of a defined set of classes of wafer defects, wherein images of the AWDI data set are computer-generated using Bezier images.

2. The device of claim 1 wherein the CNN circuitry, in operation,
    associates, based on the digital image representation of the WDM and the data-driven model, one or more labels and one or more tags with the WDM which are associated with a defect cause.

3. The device of claim 2 wherein a tag identifies a machine associated with the defect cause.

4. The device of claim 1 wherein the CNN circuitry includes one or more convolutional layers.

5. The device of claim 1 wherein the CNN circuitry includes one or more layers which, in operation, introduce a non-linearity.

6. The device of claim 1 wherein the CNN circuitry includes one or more pooling layers.

7. The device of claim 1 wherein the CNN circuitry includes one or more fully connected layers.

8. The device of claim 1 wherein, in a training mode of operation, the CNN circuitry generates the data-driven model using the AWDI data set.

9. The device of claim 8, comprising:
    artificial image generation circuitry, which, in operation, generates the images of the AWDI data set using;
    a graphical user interface;
    python language; or
    a graphical user interface and python language.

10. The device of claim 8 wherein the generating the data-driven model includes providing layer of inspection information, type of inspection information, or both, to a fully connected layer of the CNN circuitry.

11. The device of claim 8 wherein the AWDI data set includes, for each defined class of the set of classes of wafer defects, a same number N of AWDI images.

12. The device of claim 1 wherein the data driven model associates AWDIs with root causes of wafer defects and the CNN circuitry includes an activation function, which, in operation, generates a label identifying a class of the defined set of classes associated with the WDM and a tag identifying a root cause associated with the WDM.

13. A system, comprising:
    one or more memories; and
    wafer-defect-map (WDM) classification circuitry coupled to the one or more memories, and which, in operation, generates a defect classification associated with a WDM based on a digital image representation of the WDM and a data-driven model generated using training data consisting of an artificial wafer defect digital image (AWDI) data set associating AWDIs with classes of a defined set of classes of wafer defects, wherein images of the AWDI data set are computer-generated using Bezier images.

14. The system of claim 13 wherein the WDM classification circuitry includes one or more convolutional layers, one or more pooling layers and one or more fully connected layers.

15. The system of claim 13 wherein, in a training mode of operation, the WDM classification circuitry generates the data-driven model using the AWDI data set.

16. The system of claim 15, comprising:
    artificial image generation circuitry, which, in operation, generates the AWDI data set using;
    a graphical user interface;
    python language; or
    a graphical user interface and python language.

17. The system of claim 15 wherein the AWDI data set includes, for each defined class of the set of classes of wafer defects, a same number N of AWDI images.

18. The system of claim 13 wherein the data driven model associates AWDIs with root causes of wafer defects and the WDM classification circuitry includes an activation function, which, in operation, generates a label identifying a class of the defined set of classes associated with the WDM and a tag identifying a root cause associated with the WDM.

19. The system of claim 13 wherein the WDM classification circuitry, in operation, generates one or more control signals to control a wafer-production system based on defect classifications associated with one or more WDMs.

20. The system of claim 13, wherein the WDM classification circuitry generates the defect classification associated with a WDM based on layer of inspection information, type of inspection information, or both, provided to a fully connected layer of the WDM classification circuitry.

21. A method, comprising:
generating a digital image representation of a wafer defect map (WDM); and
generating a defect classification associated with the WDM based on the digital image representation of the WDM and a data-driven model generated using training data consisting of an artificial wafer defect digital image (AWDI) data set associating AWDIs with classes of a defined set of classes of wafer defects, wherein images of the AWDI data set are computer-generated using Bezier images.

22. The method of claim 21, comprising generating the data-driven model using the AWDI data set.

23. The method of claim 22, comprising:
generating the AWDI data set.

24. The method of claim 23 wherein the AWDI data set includes, for each defined class of the set of classes of wafer defects, a same number N of AWDI images.

25. The method of claim 21 wherein the data driven model associates AWDIs with root causes of wafer defects and the generating the defect classification associated with the WDM comprises generating a label identifying a class of the defined set of classes associated with the WDM and a tag identifying a root cause associated with the WDM.

26. The method of claim 21, comprising:
generating one or more control signals to control a wafer-production process based on defect classifications associated with one or more WDMs.

27. A non-transitory computer-readable medium having contents which configure a wafer defect map (WDM) classification system to perform a method, the method comprising:
generating a digital image representation of a wafer defect map (WDM); and
generating a defect classification associated with the WDM based on the digital image representation of the WDM and a data-driven model generated using training data consisting of an artificial wafer defect digital image (AWDI) data set associating AWDIs with classes of a defined set of classes of wafer defects, wherein images of the AWDI data set are computer-generated using Bezier images.

28. The non-transitory computer-readable medium of claim 27, wherein the method comprises generating the data-driven model using the AWDI data set.

29. The non-transitory computer-readable medium of claim 28, wherein the method comprises generating the AWDI data set.

30. The non-transitory computer-readable medium of claim 27, wherein the AWDI data set includes, for each defined class of the set of classes of wafer defects, a same number N of AWDI images.

31. The non-transitory computer-readable medium of claim 27, wherein the contents comprise parameters of the data-driven model.

32. The non-transitory computer-readable medium of claim 27, wherein the data driven model associates AWDIs with root causes of wafer defects and the generating the defect classification associated with the WDM comprises generating a label identifying a class of the defined set of classes associated with the WDM and a tag identifying a root cause associated with the WDM.

33. The non-transitory computer-readable medium of claim 27, wherein the method comprises:
generating one or more control signals to control a wafer-production process based on defect classifications associated with one or more WDMs.

* * * * *